(12) United States Patent (10) Patent No.: US 12,667,868 B2
Meyler et al. (45) Date of Patent: Jun. 30, 2026

(54) LASER CLEANING SYSTEM

(71) Applicant: Automation Innovation Pty Ltd, Keysborough (AU)

(72) Inventors: Walter Meyler, Lysterfield (AU); Marcus Clarke, Mount Martha (AU)

(73) Assignee: Automation Innovation Pty Ltd, Keysborough (AU)

( * ) Notice: Subject to any disclaimer, the term of this patent is extended or adjusted under 35 U.S.C. 154(b) by 0 days.

(21) Appl. No.: 17/598,939

(22) PCT Filed: Apr. 9, 2020

(86) PCT No.: PCT/AU2020/050356

§ 371 (c)(1),
(2) Date: Sep. 28, 2021

(87) PCT Pub. No.: WO2020/206500

PCT Pub. Date: Oct. 15, 2020

(65) Prior Publication Data

US 2022/0168786 A1 Jun. 2, 2022

(30) Foreign Application Priority Data

Apr. 11, 2019 (AU) ................................ 2019901262

(51) Int. Cl.
| | |
|---|---|
| *B08B 7/00* | (2006.01) |
| *B08B 9/08* | (2006.01) |
| *B23K 26/03* | (2006.01) |
| *B23K 26/352* | (2014.01) |
| *B25J 9/00* | (2006.01) |

(Continued)

(52) U.S. Cl.
CPC .......... *B08B 7/0042* (2013.01); *B08B 9/0821* (2013.01); *B23K 26/032* (2013.01); *B23K 26/352* (2015.10); *B25J 9/0096* (2013.01); *B25J 9/1697* (2013.01); *B25J 11/0085* (2013.01);

(Continued)

(58) Field of Classification Search
CPC ..................................................... B08B 7/0042
See application file for complete search history.

(56) References Cited

U.S. PATENT DOCUMENTS

| | | | | |
|---|---|---|---|---|
| 5,928,533 A | 7/1999 | Benea et al. | | |
| 6,369,353 B1 * | 4/2002 | Soska | ..................... | B29C 33/72 |
| | | | | 219/121.68 |

(Continued)

FOREIGN PATENT DOCUMENTS

| | | | |
|---|---|---|---|
| CN | 105170573 | | 12/2015 |
| CN | 109048068 A | * | 12/2018 |

(Continued)

OTHER PUBLICATIONS

Machine translation: JP01122688A; Ehata, K. (Year: 1989).*

(Continued)

*Primary Examiner* — Natasha N Campbell
(74) *Attorney, Agent, or Firm* — McDonald Hopkins LLC

(57) ABSTRACT

An automated cleaning system for cleaning an object, comprising a laser configured to be directed at the object, to remove contaminants from the object; detection system to identify details about the object; rotation apparatus to rotate the object in a cleaning position; and control apparatus to direct the laser at the object in the cleaning position, and operate the laser to clean the object.

19 Claims, 10 Drawing Sheets

(51) Int. Cl.

| | | |
|---|---|---|
| *B25J 9/16* | (2006.01) | |
| *B25J 11/00* | (2006.01) | |
| *B25J 15/00* | (2006.01) | |

(52) U.S. Cl.
CPC ....... *B25J 15/0019* (2013.01); *B25J 15/0066* (2013.01)

(56) References Cited

U.S. PATENT DOCUMENTS

| | | | |
|---|---|---|---|
| 9,950,359 B2 | 4/2018 | Sakuma et al. | |
| 2008/0031298 A1* | 2/2008 | Sakai | B23K 26/0665 |
| | | | 372/55 |
| 2010/0071736 A1* | 3/2010 | Watanabe | A61B 1/125 |
| | | | 134/56 R |
| 2018/0297242 A1 | 10/2018 | Singh et al. | |
| 2019/0351873 A1* | 11/2019 | Dalal | B60R 11/04 |
| 2020/0001393 A1* | 1/2020 | Philippron | B23K 26/356 |

FOREIGN PATENT DOCUMENTS

| | | | | | |
|---|---|---|---|---|---|
| CN | 109201634 A | * | 1/2019 | ............. | B08B 13/00 |
| EP | 3814029 A1 | | 5/2021 | | |
| JP | 01122688 A | * | 5/1989 | .......... | B23K 26/707 |
| JP | 2004167744 A | | 6/2004 | | |
| WO | 1999042228 | | 8/1999 | | |
| WO | WO-2017081460 A1 | * | 5/2017 | .......... | B23K 1/0008 |

OTHER PUBLICATIONS

Machine translation: CN105170573A; Jiao et al. (Year: 2015).*
Machine translation: CN109048068; Meng, F. (Year: 2018).*
Machine translation: CN109201634; Zhang, M. (Year: 2019).*
Patent Cooperation Treaty (PCT), International Search Report and Written Opinion for Application PCT/AU2020/050356 filed Apr. 9, 2020, mailed Jul. 13, 2020, International Searching Authority, AU.
Extended European Search Report for Application 20786973.6, PCT/AU2020050356, dated Dec. 22, 2022, 10 pgs., European Patent Office, Germany.

\* cited by examiner

LASER CLEANING SYSTEM

CROSS-REFERENCE TO RELATED APPLICATION

This application is a 35 U.S.C. § 371 national stage application of PCT Application No. PCT/AU2020/050356 filed on Apr. 9, 2020, entitled "Improved Laser Cleaning System," which claims priority to Australian Patent Application No. 2019901262 filed on Apr. 9, 2019, each of which are incorporated herein in their entirety by reference.

FIELD OF THE INVENTION

The present invention relates to a cleaning system, in particular an automated cleaning system for cleaning objects. For convenience, the invention will be described with reference to the cleaning of moulds or parts thereof used in the manufacture of glass bottles. However, the invention has broader application.

BACKGROUND OF THE INVENTION

One common process to manufacture of glass containers or bottles is a two-stage moulding process. In the first stage, molten glass is poured into a first mould to form a parison of a certain shape and dimensions. In the second stage, the parison is moved to a second mould, where it is blown into the mould to take the final shape of the glass bottle or container.

Typically, a graphite based lubricant solution is applied to the moulds between each manufacturing cycle, to facilitate removal of the glass item from the mould. Over time, residual lubricant (and/or other contaminants) builds up as a scale on the moulds. Therefore, the moulds need to be periodically removed for cleaning.

Cleaning of the moulds usually takes place at a cleaning site that is remote from the manufacturing facility, usually taking about 4 hours for a set of moulds to clean, and involves shot blasting the moulds with ceramic, metal or sand beads.

Under this system, the blasting erodes the parent material of the mould. This means that, over time, the mould tolerance deteriorates, and this deterioration must be compensated for during the manufacturing process (for example by adding extra glass to the shot to maintain the volume of the container—which can be very expensive), or alternatively the mould must be replaced (i.e. the cleaning process can decrease the lifespan of the mould).

The gradual erosion of the mould material also means that its square edges become dulled, and the dulled edges need to be dressed by a qualified tradesperson. This is labour- and time-intensive, and also expensive.

Furthermore, the erosion of the mould can cause fine glass features (such as a logo, branding or other indicia) to become dulled and unclear.

Another problem with this system is that ceramic beads get stuck in the air ports of a mould. This causes issues in the main manufacturing line—in particular, it can cause contamination and defects in containers.

Additionally, both the blasting process and inspection of the cleaned objects is a completely manual process. Inconsistencies of quality can arise between different operators.

Typically, moulds are formed from multiple parts based on the shape of the glass bottle or container. In some circumstances, the cleaning of the moulds would be better achieved by cleaning the individual parts of the mould separately. However, mould parts are particularly difficult to clean manually due to their size and intricate features. Presently, there is no system to clean individual parts of the mould.

Australian patent application no 2018203176 describes a cleaning system for cleaning objects using a laser. In this system, the laser is configured to be directed at the object, such as a glass mould, to remove contaminants when moved into a cleaning position. The object is moved into position by a robot that has been pre-programmed with the configuration of the object to be cleaned. The position of the objects is fixed having been programmed for a group of objects with the same configuration.

There exists a need to overcome, or at least alleviate, one or more of the difficulties or deficiencies associated with the prior art.

SUMMARY OF THE INVENTION

In one aspect of the present invention, there is provided an automated cleaning system comprising:

a laser configured to be directed at the object, to remove contaminants from the object;

detection system to identify details about the object;

rotation apparatus to rotate the object in a cleaning position; and control apparatus to direct the laser at the object in the cleaning position, and operate the laser to clean the object.

By 'object' as used herein is meant an object suitable for cleaning with a laser. Such objects may include without limitation industrial/small parts, moulds, tools and/or parts thereof.

The objects are made from materials that can withstand the effects of laser. For example, aluminium, steel or iron. Preferably, the object is a mould used in the manufacture of glass bottles or the individual parts of the mould used in the manufacture of glass bottles.

By 'cleaning' as used herein is meant to remove or dislodge contaminants, or other type of debris or impurities from the surface of the object without affecting the underlying surface of the object such that minimal damage or corrosion (if any) occurs at the object's surface. Contaminants that may be removed or cleaned from the surface of the object may include without limitation dust, paint, scale, rust or oxide coating etc. that may have accumulated on the surface for example during storage, use or following the manufacture of the object.

By 'laser' as used herein is meant a relatively high powered industrial laser suitable for cleaning, i.e. removing or dislodging, contaminants from the surface of the object. Preferably, the laser has a power output of between about 5 and 500 mWatts, more preferably 200 and 1000 Watts, most preferably about 1000 Watts. The power output can be adjusted either up or down as appropriate depending on the power required to clean the object.

The laser may include a 'lens' and 'lens monitor'. The lens monitor can be used to monitor the condition of the lens. Preferably, the lens monitor includes an infrared sensor to monitor the temperature of the lens.

The 'detection system' may include one or more apparatus or means for detecting, observing and/or monitoring the object. The apparatus may for example include one or more cameras, scanners, lasers or any other suitable means known to detect and/or observe the object.

The 'detection system' may include one or more systems suitable for detecting, observing and/or monitoring the object including, for example, a vision or optical system, laser scanner, Radio-Frequency Identification (RFID) system, physical touch system, x-ray system, ultrasonic system.

The detection system may be configured to detect various aspects of the object, in particular certain details about the object. Such details include, but not limited to, the surface quality, 3D profile, contaminates or impurities on the surface of the object, location within the system etc.

The detection system may be configured to scan the object to obtain a 3D profile of the object. The detection system in this embodiment may include a vision system. Preferably, the vision system includes a 3D scanning camera, for example a 3D infrared or 3D laser camera, to scan the object.

The detection system may be configured to track an object as it moves through the cleaning system and/or monitor its cleaning history. For example, the detection system may include a vision system, laser scanner or RFID system that reads an individual mark tagged on the mould or part. Preferably, each object is tagged with a device, mark or similar that can be detected by the detection system.

The detection system may be configured to monitor the quality of the surface of the object, such that chips, cracks and/or other surface defects can be detected. Any remaining contaminants on the surface of the object after cleaning can also be detected. For example, the detection system may include a vision system, laser scanning surface system, physical touch system, x-ray inspection and/or ultrasonic inspection device to compare the object against a pre-programmed model of the object. This may involve for example, measuring the volume of the object against a CAD model of the object. Any object found to have chips, cracks or any other defect can then be removed for repair or otherwise replaced. Additionally, any object found to have any remaining contaminants of the surface can be re-cleaned.

The detection system can be configured to indicate to an operator which of the objects needs to be repaired, replaced and/or re-cleaned. The detection system may include a marking source to highlight the objects in need of repaired, replaced and/or re-cleaned. Preferably, the marking source uses light illumination. More preferably, the marking source is in the form of a laser, light indicator, physical marking or light projection.

The detection system may be configured to monitor the performance of the laser. Preferably, the detection system includes an optical sensor to monitor the surface of the object. A closed loop feedback system allows the speed of the laser to be adjusted during the cleaning process to ensure that the laser is cleaning in an effective manner. For example, the speed may be adjusted by increasing and/or decreasing with comparative contamination of the object. The adjustment can be made continually during the cleaning process depending on the location of the contaminants on the surface of the object. For example, some areas of the object may require more cleaning than other areas.

The detection system may be configured to monitor the focal distance of the laser from the surface of the object. Preferably, the detection system includes an optical sensor to monitor the focal point of the laser. A closed loop system allows for the focal distance of the laser to be continually adjusted during the cleaning process.

The 'rotation apparatus' holds the object in place whilst it is being rotated during the cleaning process. The apparatus may be a platform (such as a turntable), basket or other suitable means to receive or place the object. The rotation apparatus may rotate the object about a fixed vertical axis (i.e. in a single plane), however, it is also contemplated that vertical axis is not fixed and changes orientation such that the rotation apparatus tilts the object in various directions during rotation. Preferably, the rotation apparatus rotates at a consistent speed. The speed of rotation can be adjusted either faster or slower as appropriate. The rotation apparatus may also include a processor in communication with the detection apparatus, the rotation apparatus being configured to adjust the rotation during the cleaning process in response to observations made by the detection apparatus.

The 'control apparatus' is configured to move the laser and selectively turn the laser on and off. The control apparatus may include a processor in communication with the detection apparatus, the processor being configured to move the laser in a cleaning pattern over the object, in response to observations made by the detection apparatus. In one embodiment the control apparatus is a cleaning robot having the lens and optionally the lens monitor mounted on an arm of the robot.

Preferably, the 'control apparatus' further includes a fume exhaust system to draw away fumes from the laser during the cleaning process.

Preferably, the automated cleaning system further includes a movement apparatus to move the object into and/or out of the cleaning position. In one embodiment, the movement apparatus may be a handling robot having a holding arm with a gripper, to hold the object, move the object to or from the cleaning position, and then release the object.

Preferably, the cleaning system further includes a housing to provide an isolated space for cleaning of the object. The housing may include receiving cells to receive the objects, the receiving cells having a safety guard or gate that is openable to allow the entry of the objects into the isolated space of the housing for cleaning. In one embodiment, the housing is an enclosed container, such as a shipping or storage container or other similar type of container or unit, of suitable scale to house the cleaning system within the enclosed space.

The cleaning system may be assembled in a housing off-site and transported to the relevant location or alternatively the system can be provided in parts ready for installation on-site in an appropriate housing provided.

The cleaning system may further include a carriage apparatus to carry the object into and out of the isolated space of the housing. The carriage apparatus may be a tray for placing a set of objects that can be placed in the receiving cells of the housing then maneuvered into the isolated space. Preferably, the tray is placed on top of a trolley, conveyer belt or other mechanism that can carry the object(s) into and out of the isolated space. Optionally, the movement apparatus may sequentially move each object from the carriage apparatus into the cleaning position for cleaning, and return the object to the carriage apparatus after cleaning. Alternatively, the carriage apparatus moves the objects into the cleaning position.

The system may further include a user interface, including a monitor, input device(s) and associated software. The user interface may allow the operator to program the profile of the object in an intuitive manner without the need to program each apparatus separately. The procedure for programming the profile of the object may include providing a predetermined profile shape type; and prompting a user to specify one or more parameters of the predetermined profile shape type. Alternatively, the detection system can be used to scan the object and prepare 3D co-ordinates of the object. The system can then adapt the laser to the object without need for the parameters to be predetermined. The system may also manipulate various components of the system in response to the co-ordinates, for example, the rotation apparatus can be tilted in various positions, or the movement apparatus may also be configured so as to place the object in a particular orientation to maximise contact with the laser during the cleaning process.

In another aspect of the invention, there is provided a method for automated cleaning of an object, the method including the steps of:

carrying the object into an isolated space;

moving the object to a cleaning position;

detecting details of the object;

cleaning the object using a laser mounted on a control apparatus and optionally rotating the object; and carrying the object out of the isolated space.

In another aspect of the invention, there is provided a method for automated cleaning of an object, the method including the steps of:

carrying the object into an isolated space;

moving the object to a cleaning position;

scanning the object using a 3D scanning camera to obtain a 3D profile of the object;

cleaning the object using a laser mounted on a control apparatus and optionally rotating the object; and carrying the object out of the isolated space.

In another aspect of the invention, there is provided a method for monitoring the condition of a lens used in an automated cleaning system, the method including measuring the temperature of the lens using an infrared sensor. The method according to this aspect may include measuring the temperature before, during and/or after the cleaning of the object.

In another aspect of the invention, there is provided a method of monitoring the quality of the objects cleaned in the automated system, the method including projecting a visual mark onto the objects in need of repair, replacement and/or re-cleaning.

Through the use of the invention, objects can be cleaned in a precise and repeatable fashion. The use of a laser has advantages over conventional shot blasting methods used for cleaning glass manufacturing moulds or parts, in that there is little if any erosion of the moulds or parts.

In addition, the use of automated apparatus, such as the robot(s), within an isolated space means that operators and other workers at the cleaning facility are not exposed to noxious fumes generated during the laser cleaning process.

The use of the rotational apparatus allows the object to be rotated and cleaned simultaneously such that the object does not need to be picked-up and turned manually by the handling robot for cleaning. The rotation apparatus also allows for the scanning of the whole object. The data obtained is looped back to the cleaning robot. The control apparatus can then adapt its program in real time.

In this specification, the term 'comprises' and its variants are not intended to exclude the presence of other integers, components or steps.

In this specification, reference to any prior art in the specification is not and should not be taken as an acknowledgement or any form of suggestion that this prior art forms part of the common general knowledge in Australia or any other jurisdiction or that this prior art could reasonably expected to be combined by a person skilled in the art.

The present invention will now be more fully described with reference to the accompanying Examples and figures. It should be understood, however, that the description following is illustrative only and should not be taken in any way as a restriction on the generality of the invention described above.

For the purpose of example, numerous specific details are set forth in the following description in order to provide a thorough understanding of the present invention. The present invention may be practiced according to the claims without some or all of these specific details. For the purposes of clarity, technical material that is known in the technical fields related to the invention has not been described in detail so that the present invention is not unnecessarily obscured.

BRIEF DESCRIPTION OF THE DRAWINGS/FIGURES

In the Figures:

FIG. 1 shows an orthographic views I to VII of an improved cleaning system according to the invention within a housing shown for convenience with doors open, without roof and side walls to view the internal parts of the system. Detail 'A' shows a detail of view V. Detail 'D' shows a detail of view I.

Figure 1:
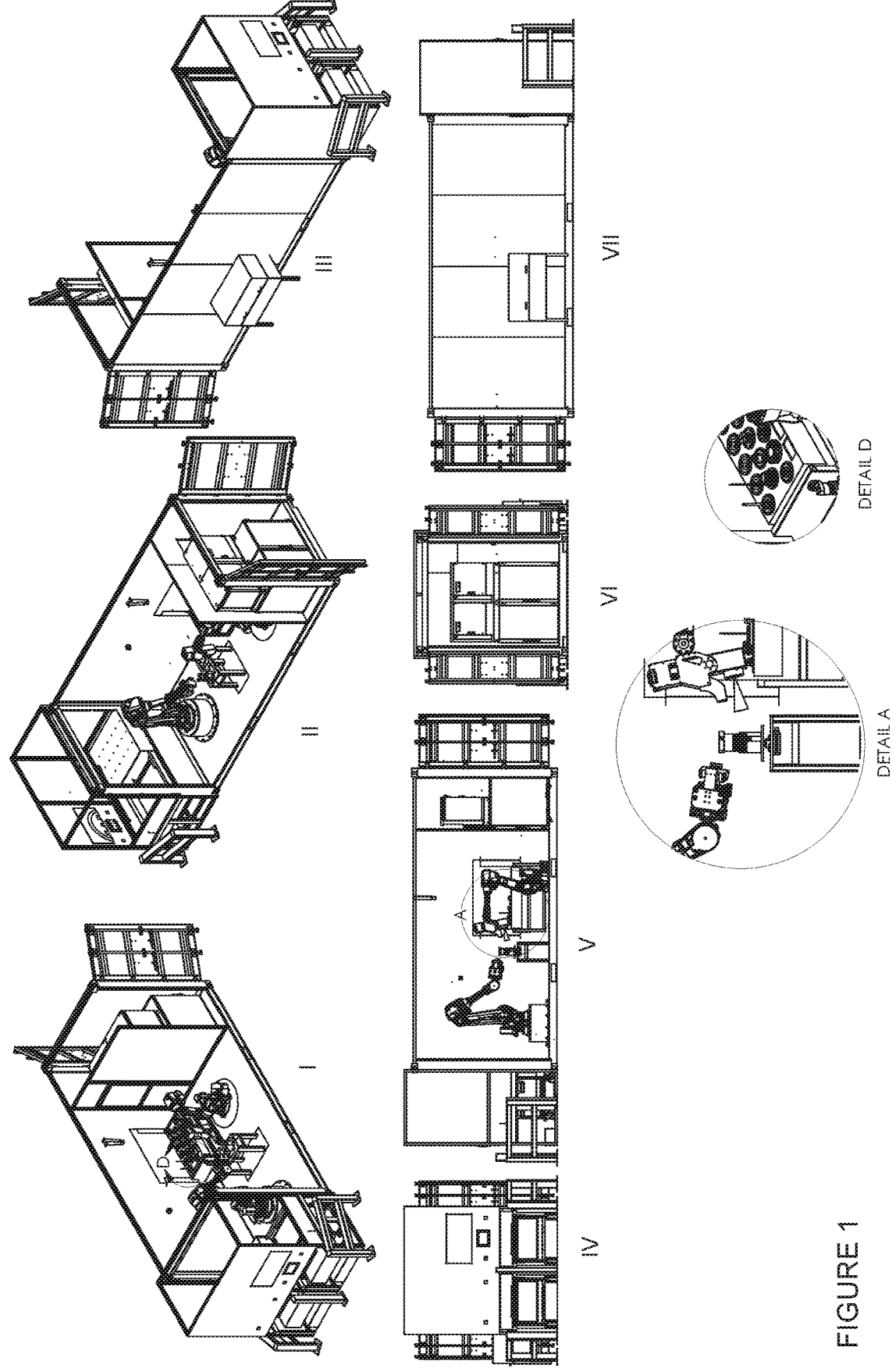
Figure 5:
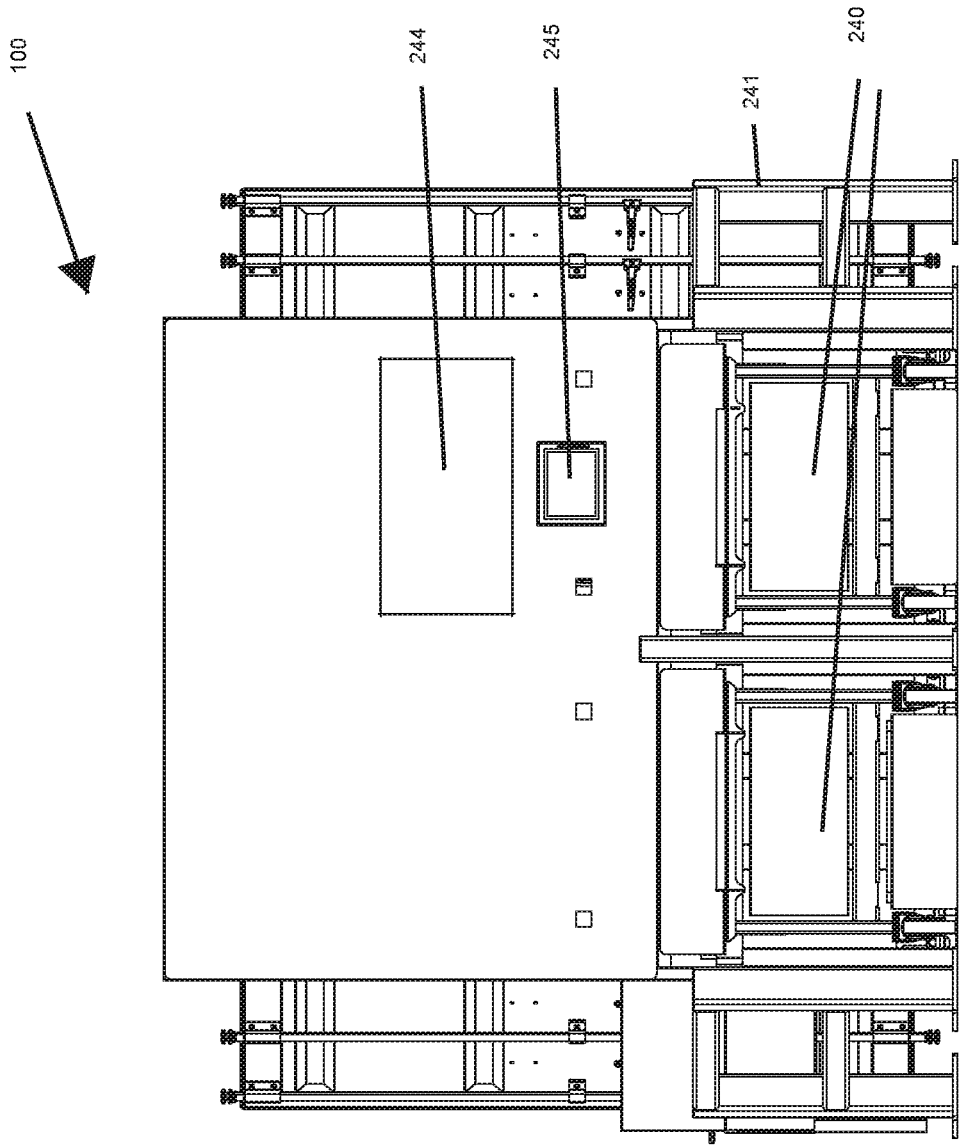
Figure 6:
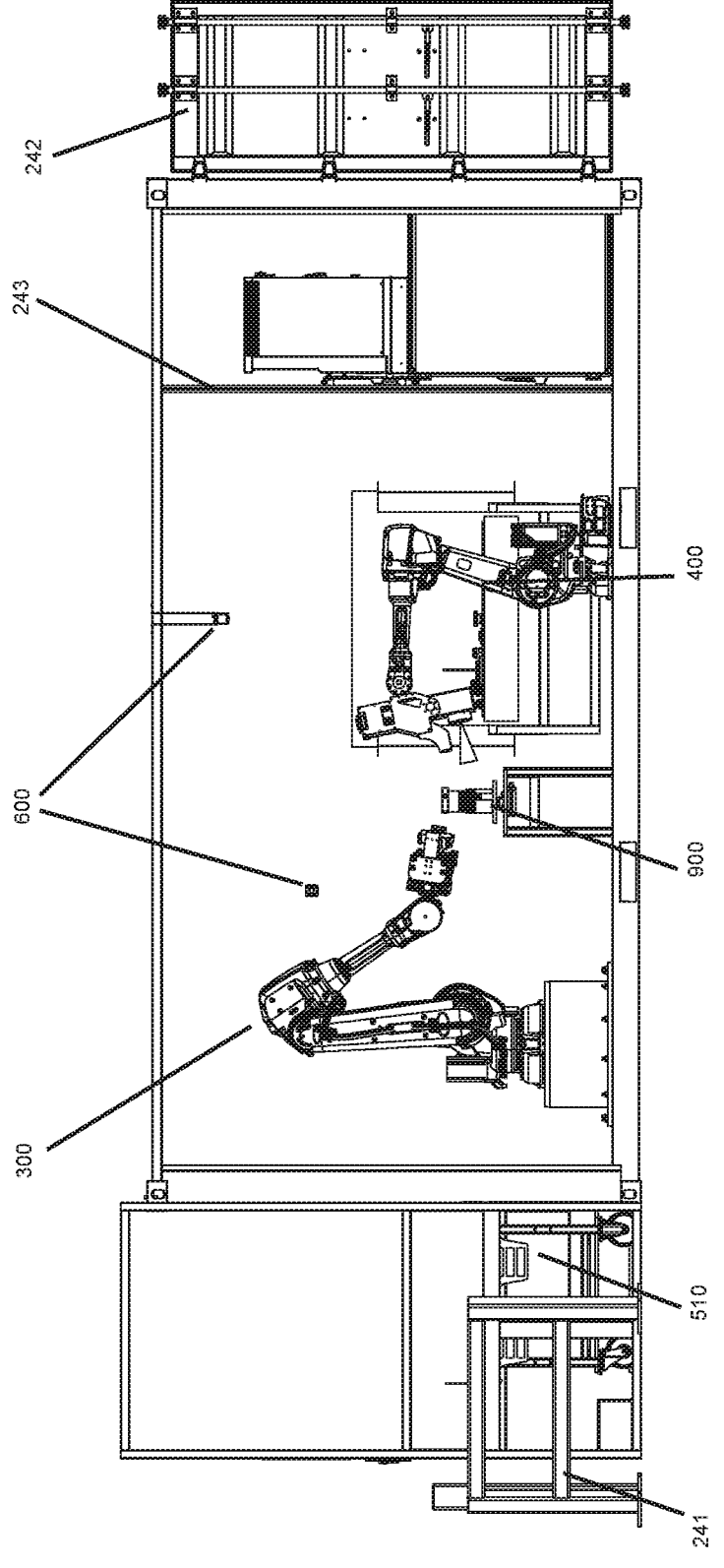

FIG. 5 shows view IV (end 1) of FIG. 1. The width of the housing in this view is 2550 cm FIG. 6 shows view V (side 1) of FIG. 1. The height of the housing shown in this view of 3050 cm and length is 7506 cm.

Figure 7:
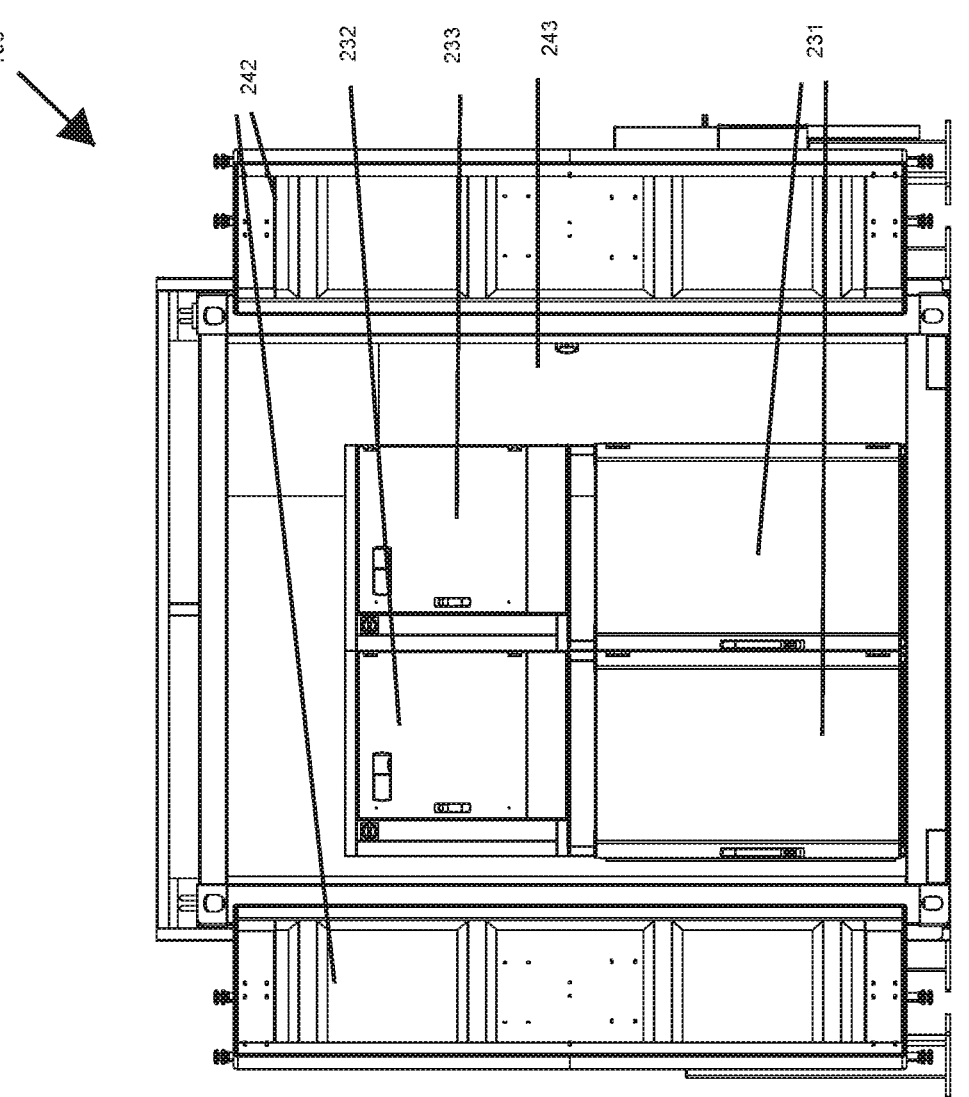

FIG. 7 shows view VI (end 2) of FIG. 1.

Figure 8:
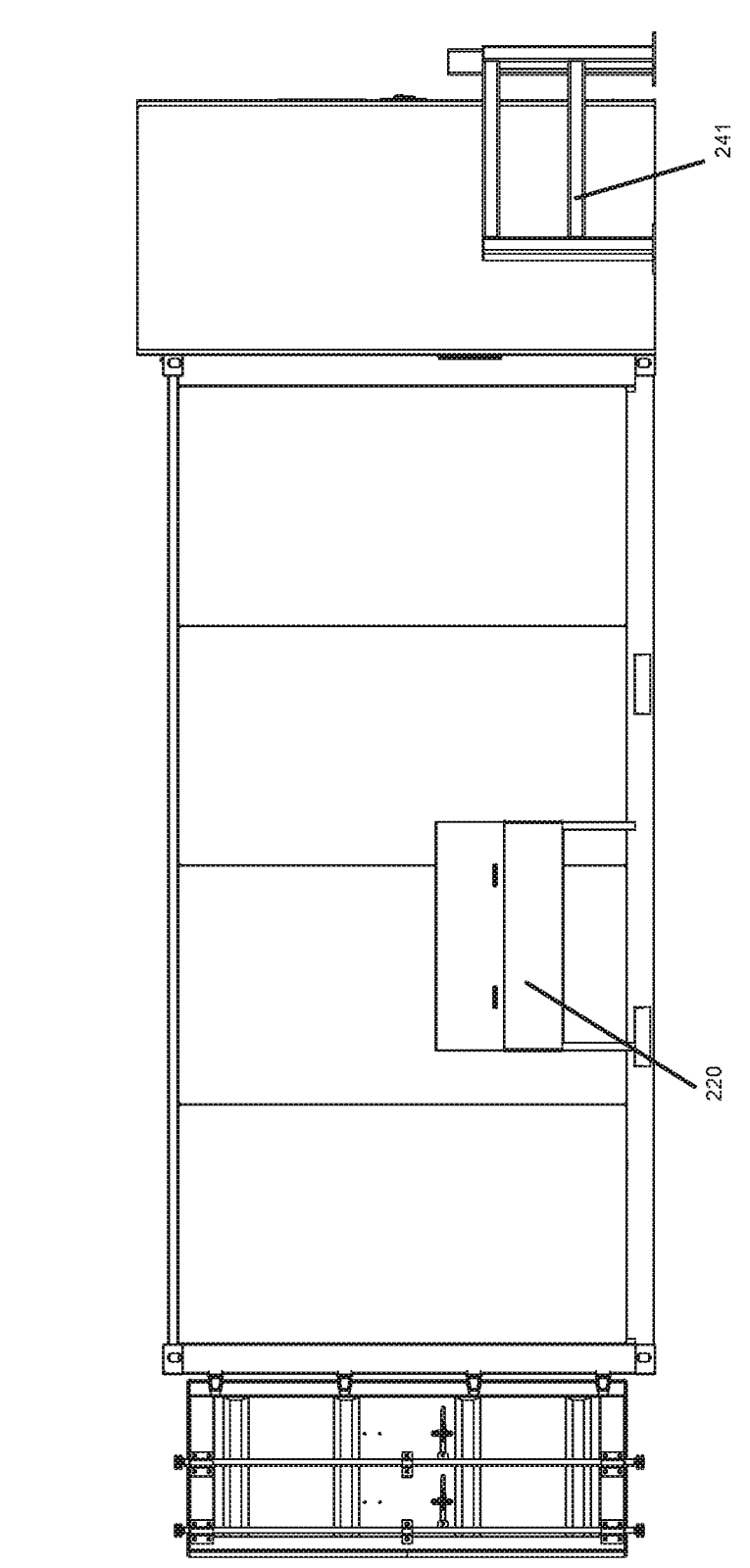

FIG. 8 shows view VII (side 2) of FIG. 1.

Figure 9:
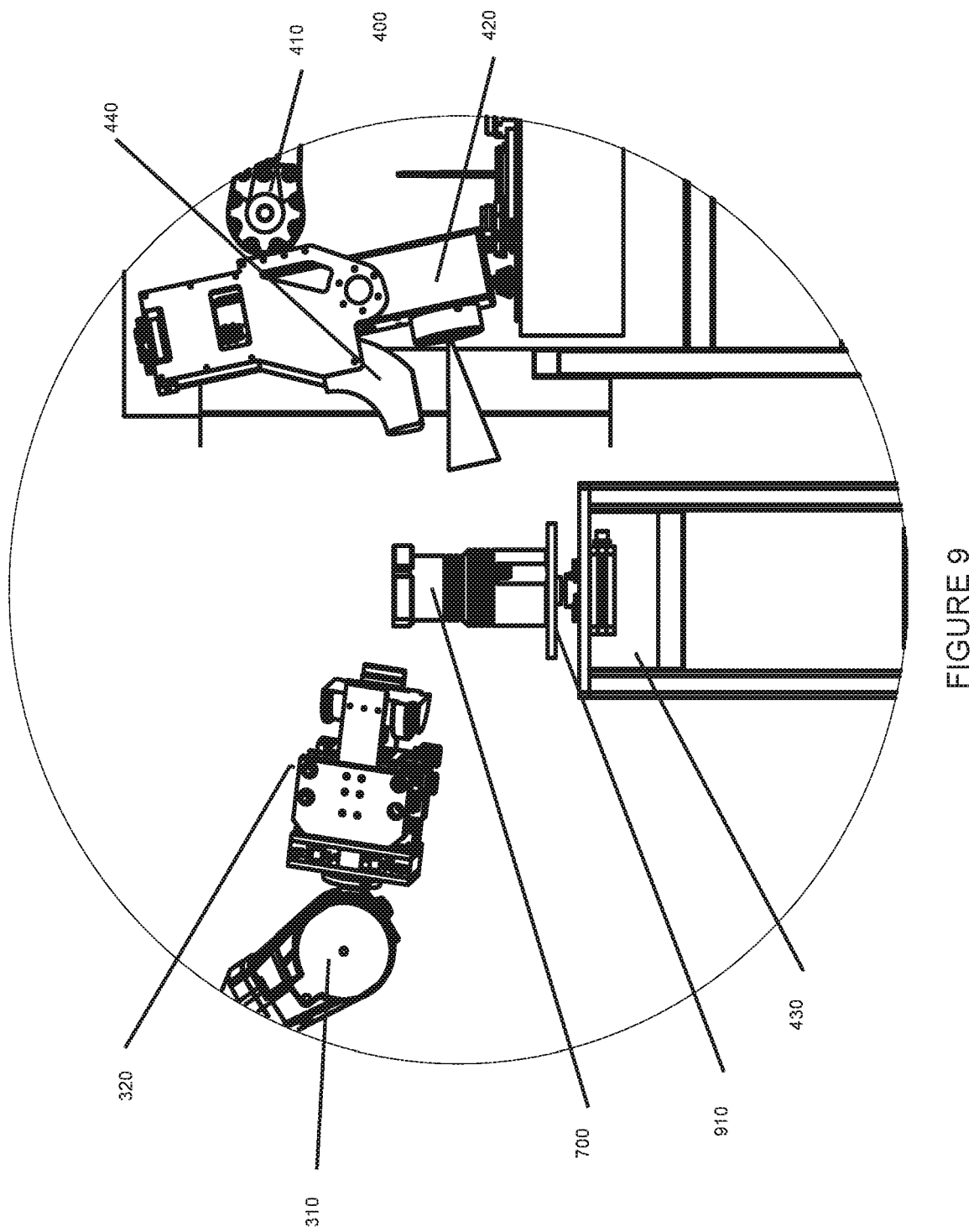

FIG. 9 shows detailed view A of FIG. 6

Figure 2:
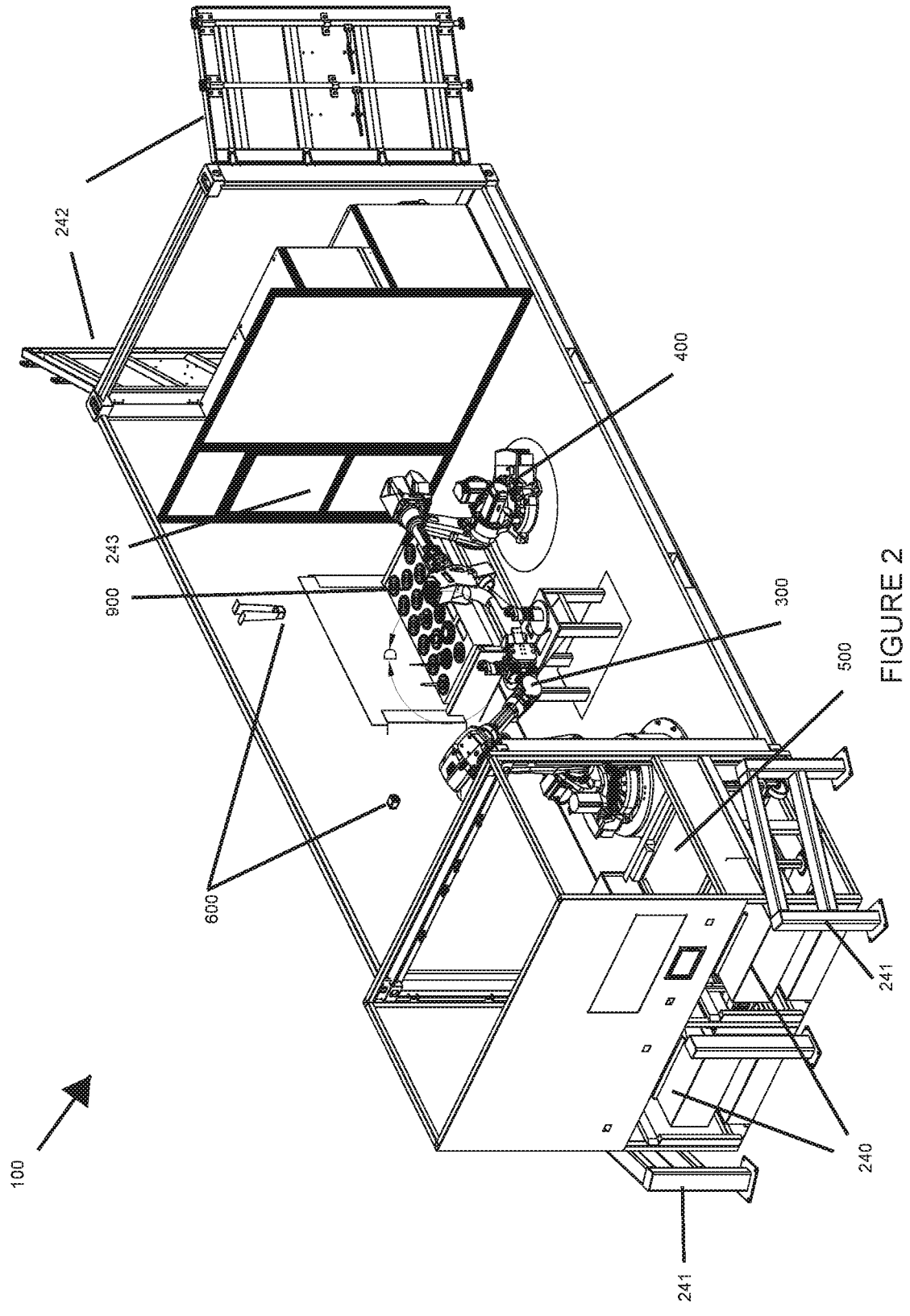
FIG. 2 shows view I (isometric view 1) of FIG. 1.
Figure 3:
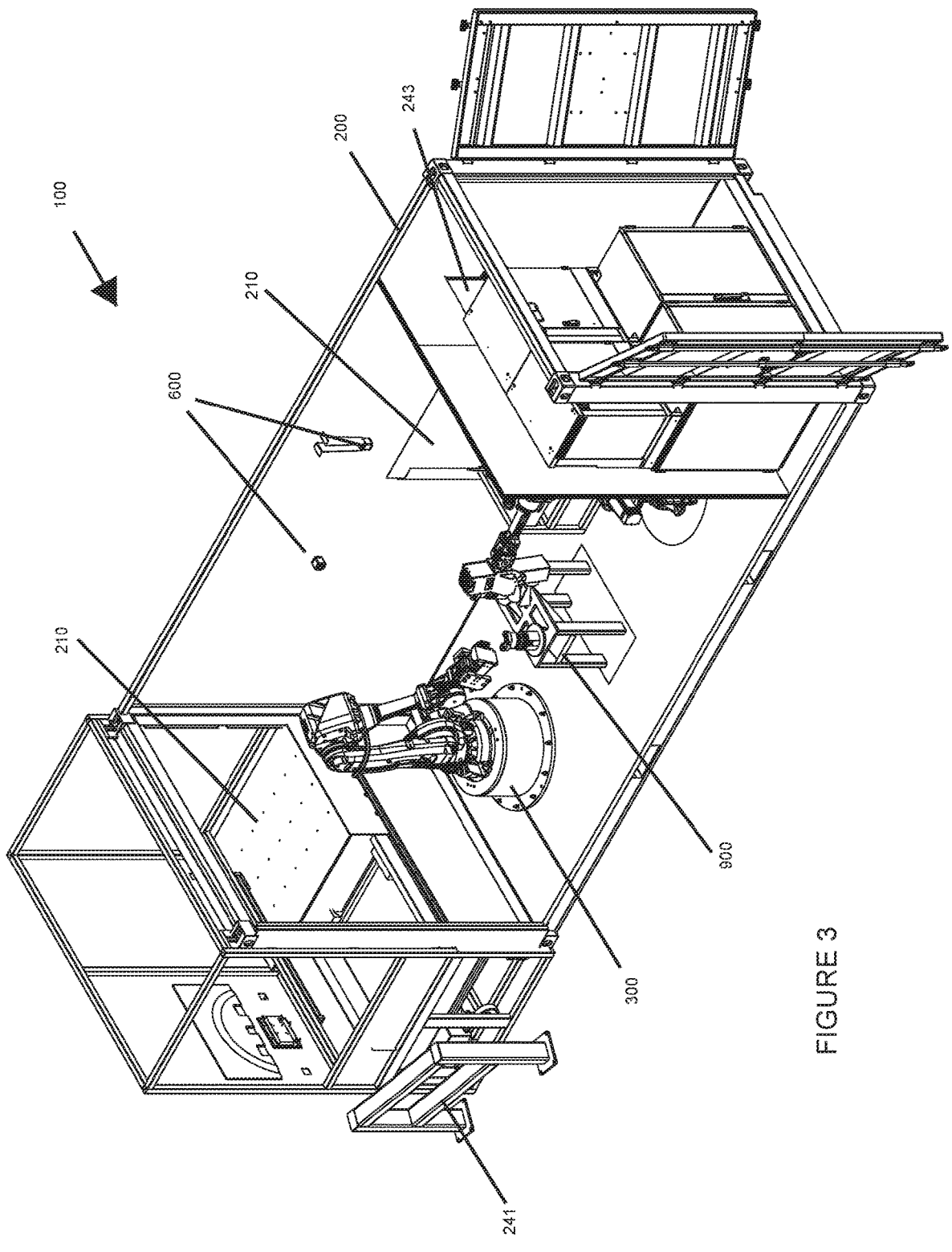
FIG. 3 shows view II (isometric view 2) of FIG. 1.
Figure 4:
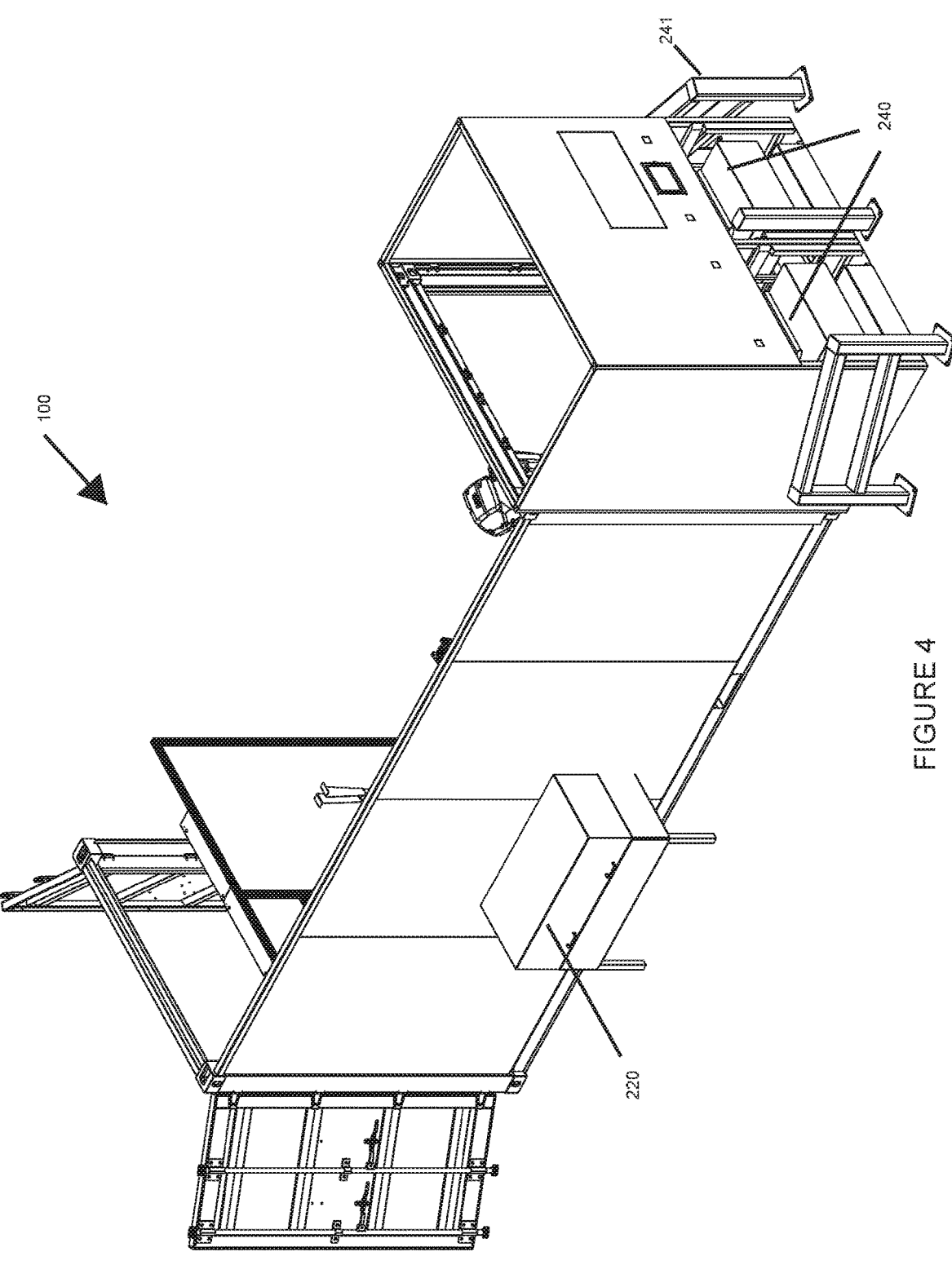
FIG. 4 shows view III (isometric view 3) of FIG. 1
Figure 10:
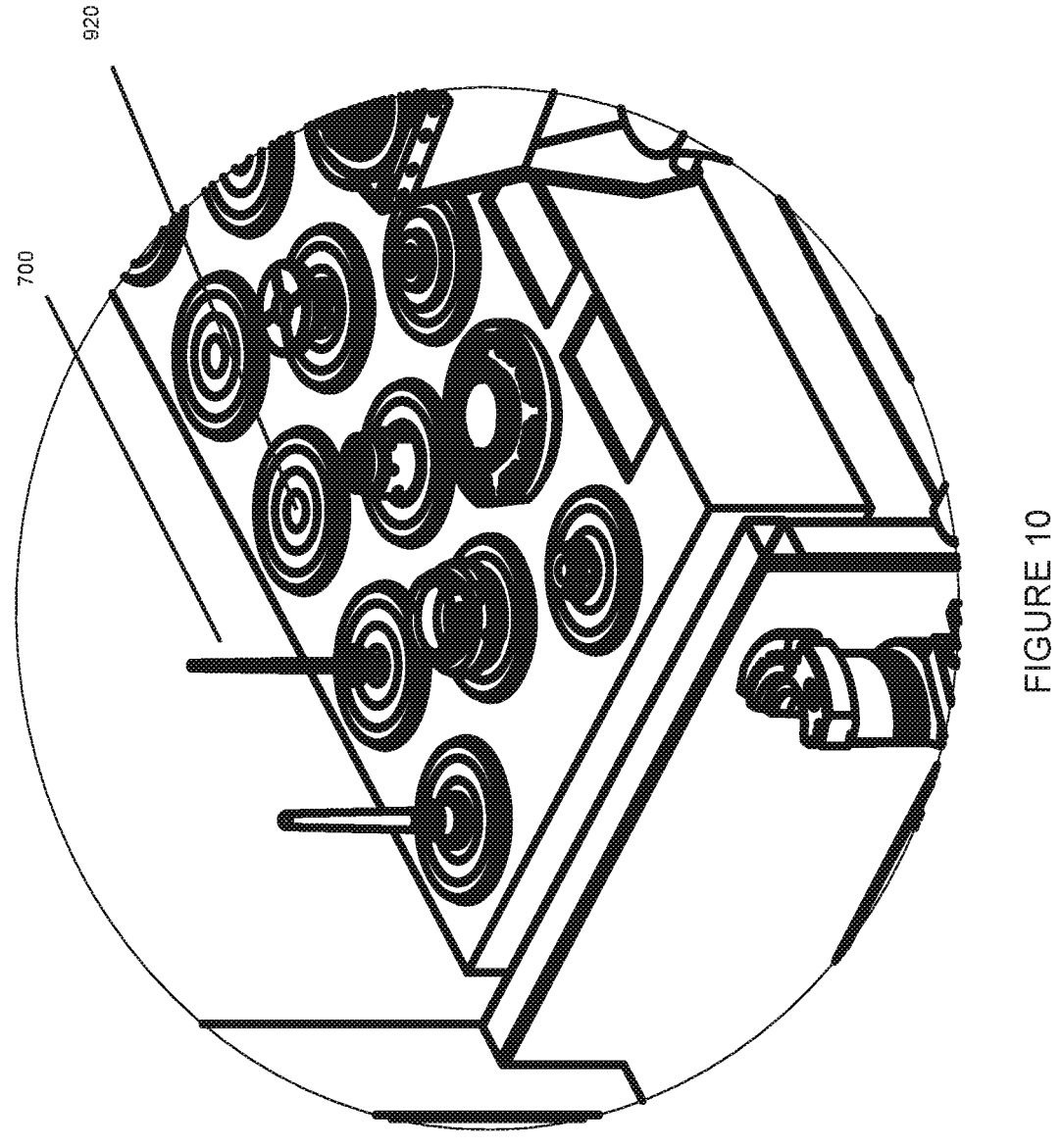

FIG. 10 shows details view D of FIG. 2.

DETAILED DESCRIPTION OF THE EMBODIMENTS

Referring to FIG. 1 there is shown views I to VII of a preferred embodiment of the improved laser cleaning system 100 within a housing 200 for convenience with external doors 242 open, without roof and side walls to view the internal parts of the system. FIGS. 2 to 8 correspond to views I to VII respectively. The housing 200 provides an isolated space for cleaning of glass manufacturing moulds 700 or parts thereof. It will be appreciated that the system can also be used for cleaning other similar objects.

REFERENCE NUMBERS USED IN FIGURES

| | |
|---|---|
| 100 | Laser cleaning system |
| 200 | Housing |
| 210 | Safety guards |
| 220 | External loading station/small parts loading station |
| 231 | Laser module cabinet(s) |
| 232 | Handling robot cabinet(s) |
| 233 | Laser cleaning robot cabinet |
| 240 | Trolley loading station(s) |
| 241 | Part receiving cell guards |
| 242 | Doors (external) |
| 243 | Access door (internal)/maintenance access door |
| 244 | Multi use display |
| 245 | HMI screen |
| 300 | Handling robot/Part handling robot |
| 310 | Part handling arm |
| 320 | Part gripper |
| 400 | Cleaning robot |

-continued

| 410 | Control arm |
| 420 | Laser cleaning module |
| 430 | Cleaning station |
| 440 | Fume extraction device |
| 500 | Trolley tray |
| 510 | trolley |
| 600 | Detection devices eg 3D scanning cameras |
| 700 | Glass manufacturing moulds/small parts |
| 900 | Rotation apparatus |
| 910 | part turntable |
| 920 | rotating part platform |

The system shown in these figures is described in further detail.

Within the isolated space, there are a provided a pair of robots—a handling robot 300, and a cleaning robot 400. A tray 500 optionally placed on top of a trolley 510 is provided to carry one or more moulds or parts thereof 700 into and out of the housing 200. In one embodiment, the tray includes at least one rotation apparatus 900 upon which the one or more moulds or parts thereof are placed. In addition, detection devices 600, in this embodiment 3D scanning cameras, are also provided to observe and/or scan the objects within the isolated space.

Moulds are placed onto a tray to be placed on a trolley or directly onto the trolley then moves into and out of the isolated space through receiving cells or trolley loading station 240 and guided by safety guards 241. The trolley then enters into the system through safety guards 210.

The handling robot 300 includes a handling arm 310 with a claw or gripper 320 at its end, which is sized appropriately to grasp the mould(s) or parts thereof 700.

The handling robot 300 includes a processor, which receives data from the 3D scanning cameras 600. The data from the 3D scanning cameras 600 may be received in raw form by the handling robot 300, and analysed to determine the position and/or 3D configuration of the moulds or parts thereof 700. This is detailed further below.

Alternatively, the data may be externally processed (e.g. by a separate processor associated with the cameras 600) to identify relevant features of the mould within the housing 200, such as its position. This position data can then be transmitted to the robots 300, 400. Once the position of the moulds 700 is determined, the processor of the handling robot 300 can then control the operation of the handling arm 310 and claw 320, to move the moulds 700 for cleaning, as explained below.

The cleaning robot 400 includes a control arm 410, which has a laser 420 mounted on it. Different types of laser may be used depending on the particular application, but in this embodiment, the laser is preferably a relatively high powered industrial laser in the range of 200 W to 1000 W. In one (non-limiting) embodiment, the laser may be a 1000 W laser operating at approximately 1064 nm wavelength.

In one aspect, moulds or parts for cleaning are placed on the tray on top of the trolley placed in the receiving cell 240 that enters through the safety guards 210. In this embodiment, a single mould 700 is picked up by the claw or gripper 320 of the handling robot 300, and transferred into a cleaning position within a cleaning station 430 of the cleaning robot 400. The cleaning station includes a rotation apparatus 900 upon which the mould is placed and rotated (this is shown in detail in FIG. 9). In this embodiment, the rotation apparatus is a turntable consisting of a flat surface upon which the mould can be simply placed on top then rotated during the cleaning process. The use of a specific cleaning station 430 ensures that the mould 700 is precisely positioned for cleaning, and ensures that the cleaning robot 400 with the laser cleaning module 420 can clearly identify features of the mould 700 that require cleaning. The cleaning station includes mould detection sensors (not shown), which detect when a mould or mould part is in place and ready for cleaning.

The cleaning operation, at this stage, may follow a variety of cleaning algorithms depending on the particular object to be cleaned, and the nature of any scale or other contaminants on the surface of the mould or mould part.

One option is be for the cleaning robot 400 to simply follow a predetermined pattern to ensure the laser is applied to all areas of the mould or parts thereof 700. However, this will usually be inefficient. Accordingly, data from the cameras 600 is preferably used to precisely identify the mould features and the areas of contamination. For example, contaminated areas are frequently of a different colour to the rest of the mould 700. Contamination of moulds 700 also typically occurs more frequently in some areas than in others—for example, around the edges of the mould. The image data from cameras 600 may be analysed to look for colours associated with contamination, and/or shapes within the mould 700 (based on the mould design) that are susceptible to scale build up. This allows contaminated areas to be identified more precisely, for cleaning by the cleaning robot 400. The identification of contaminated areas may be assisted if mould profile data (for the mould 700 to be cleaned) is loaded into the control software for the cleaning robot 400 (and/or handling robot 300), via a user interface. This provides a simpler way to program mould profile data into the control system.

Once the mould 700 has been cleaned, it is returned to the tray 500 located on the trolley 510 by the handling robot 300. The next mould 700 can then be picked up, moved to the cleaning position, cleaned and returned to the tray 500 located on the trolley 510 as described above.

Once an entire set of moulds 700 have been cleaned, the trolley carrying the cleaned moulds or mould parts can exit the housing 200 through the safety guard 210.

In another aspect, mould parts 700 are placed on a tray comprising rotation apparatus (details shown in FIG. 10). The tray is loaded in an external loading station 220. This tray then enters through the safety guards 210 ready for cleaning. In this embodiment, the mould parts are scanned by the 3D scanners 600 to measure the co-ordinates of the mould part including height and width. This data is provided to the processor of the cleaning unit and the parts are cleaned by the cleaning apparatus on the tray whilst being rotated on a platform 900. Once an entire set of mould parts 700 have been cleaned, the tray can exit the system back through the safety guard 210. Details of the small parts cleaning station are shown in FIG. 10.

The cleaning system 100 according to this embodiment of the present invention can clean a set of moulds or parts in far less time than conventional manual cleaning methods. In addition, cleaning using the present invention appears to result in significantly less erosion of the parent mould material.

Externally from the isolated space, there is provided cabinets that house controlling units and monitoring units for each of the components within the isolated space, such as the handling robot laser cleaning robot and laser itself. These are shown in FIG. 7 as Laser module cabinet 231, Handling robot cabinet 232, and laser cleaning robot cabinet 233, located within the housing accessible via the external doors 242.

There is also provided receiving cells for trays 240 and guards 241 for loading the moulds placed on a tray for cleaning into the system and unloading the moulds from trays once cleaned. This is shown in FIG. 5 as Trolley loading station 240.

There is also provided a small parts loading station to for loading the mould parts directly onto the rotation apparatus on a tray for cleaning into the system and unloading the mould parts from tray once cleaned.

There is also provided an internal access door 243 for personnel to optionally enter into and out of the system as appropriate.

There is also provided monitors for operators to monitor the cleaning cycle and the equipment in the isolated space. In FIG. 5 these are shown as Multi-use display 244 and HMI Screen 245.

Maintenance of the lens on the laser is important. In particular, the lens should be maintained as clean as possible, because contamination can cause cracking of the lens. To help avoid this, an exhaust system may be used to pull contamination and fumes out of the isolated space. In one embodiment, a fume extraction device 440 is placed on the laser cleaning module 420. In particular, an infrared sensor may be used to monitor the temperature of the lens, because the temperature of the lens has a direct relationship to the level of contamination on the lens. In this embodiment, the temperature of the lens is checked at substantially regular intervals, and if the temperature rises above a certain threshold, this mean the lens may be heading for failure. The particular temperature will depend on the type and quality of the lens itself. Alternatively, or in addition, the lens is monitored by scanning the band width of the lens. If outside a nominated range this indicates that the lens is ready for cleaning or replacement. The cleaning process should therefore be temporarily stopped to allow the lens to be cleaned.

Each mould or mould part may also be individually marked or tagged so they can be tracked as they are cleaned.

The invention may further be illustrated by the following non-limiting examples:

Automated Cleaning System with Vision System

This system uses a 3D infrared or 3D laser camera to scan the moulds. This system includes a 3D camera (Vision system), a handling robot with gripper to pick-up the mould from the loading unloading trays and move the mould around the system. The system can also be used for mould parts. The automated sequence includes the following steps:

a. A handling Robot picks the mould from a tray and moves the mould or part to the scanning area.

b. The vision camera then takes a scan/snapshot of the mould and converts this into x,y,z co-ordinates.

c. This is then sent to the main controller where the information is converted to robot code and stored into memory.

d. The handling Robot then places the mould onto one of two staging tables and this table position is also stored into memory.

e. The laser handling robot then executes a cleaning routine based on this data for each mould (Following this contours).

Lens Condition Monitoring

An infrared sensor is used to check the temperature of the lens on the laser optic head which is mounted on a cleaning robot.

At the end of each cleaning cycle the robot with the laser optic moves to a checking position. When in position the robot outputs a signal to the control system to take a reading from an infrared temperature measuring device. This data is then checked against a set tolerance level allowed for safe operation. The frequency of this checking can be regulated.

Indicator System

Once the cleaning cycle is completed, the moulds can be scanned to detect any remaining residue on its surface. This system can also be used for mould parts.

A projection of light/laser to indicate which mould had not been successfully cleaned.

Once the operator goes to the unload position the moulds on the tray will have an indicated light to alert the operator of any mould that did not clean correctly.

This can also be used to indicate to the operator that the moulds are damaged and in need of repair or replacement.

Small Parts Cleaning 1. a tray populated with rotating turntables in a grid system is placed in draw or loading station. The centre point of each rotating turntable is known.

2. The operator will load each position with a small part and close the draw.

3. The draw is scanned with a 3D scanner to give a height and width of the mould part. This data is then processed and converted into co-ordinates.

4. This data is then sent to the control apparatus (a laser handling robot). The control apparatus performs a cleaning cycle to clean all mould parts based on the scanned information.

5. During the cleaning cycle, each part is rotated on the tray as the laser is moved up and down to achieve a total clean of the parts.

Finally, it is to be understood that various alterations, modifications and/or additions may be made without departing from the spirit of the present invention as outlined herein.

The invention claimed is:

1. An automated cleaning system for cleaning a mould and/or mould part for use in manufacturing glass containers, comprising:

a laser configured to be directed at the mould and/or mould part and to remove contaminants from a surface of the mould and/or mould part;

a detection system configured to identify details about the mould and/or mould part;

a movement apparatus to move the mould and/or mould part into and/or out of a cleaning position;

a rotation apparatus to rotate the mould and/or mould part in the cleaning position; and a control apparatus to direct the laser at the mould and/or mould part in the cleaning position, and operate the laser to clean the surface of the mould and/or mould part, wherein the detection system is configured to analyse image data associated with the mould and/or mould part to identify contaminants based on colour and/or shapes within the mould and/or mould part;

wherein the detection system comprises a vision system comprising one or more 3D scanning cameras, wherein the one or more 3D scanning cameras obtain a 3D profile of the mould and/or mould part identifying contaminants that are located on the surface of the mould and/or mould part so that the laser can remove contaminants from the surface of the mould and/or mould part; and wherein the detection system includes an optical sensor to monitor a focal distance of the laser from the surface of an object and continually adjust the focal distance during a cleaning process and wherein the control apparatus includes a processor in communication with the detection apparatus, the processor being configured to move the laser in a cleaning pattern over the object, in response to observations made by the detection apparatus.

2. An automated cleaning system of claim 1, wherein the rotation apparatus is a turntable.

3. An automated cleaning system of claim 1, wherein the movement apparatus is a handling robot having a holding arm to hold the mould and/or mould part, move the mould and/or mould part to or from the cleaning position, and then release the mould and/or mould part.

4. An automated cleaning system of claim 3, wherein the holding arm has a gripper.

5. An automated cleaning system of claim 1, wherein the control apparatus comprises a cleaning robot configured to move the laser and selectively turn the laser on and off.

6. An automated cleaning system of claim 5, wherein the cleaning robot includes a processor in communication with the detection system, the processor being configured to move the laser in a cleaning pattern over the mould and/or mould part, in response to observations made by the detection system.

7. An automated cleaning system of claim 1, further including a housing to provide an isolated space for cleaning of the mould and/or mould part.

8. An automated cleaning system of claim 1, further comprising an exhaust system to draw away fumes from the laser during cleaning.

9. An automated cleaning system of claim 1, wherein the laser comprises a lens, and further comprising a lens monitor to detect potential failure of the lens.

10. An automated cleaning system of claim 9, wherein the lens monitor comprises an infrared sensor, to monitor a temperature of the lens.

11. The automated cleaning system of claim 1, wherein the laser has a power output of 200 to 1,000 Watts.

12. A method for automated cleaning of an object, the method comprising the steps of:

carrying the object into an isolated space for cleaning the object on a carriage apparatus;

moving the object with a movement apparatus to a cleaning position on a rotation apparatus wherein the object is rotated during cleaning;

scanning the object using a detection system comprises a vision system comprising a 3D scanning camera to obtain a 3D profile of the object identifying a location of a contaminant located on a surface of the object;

cleaning the surface of the object using a laser mounted on a cleaning robot to remove the contaminant;

moving the object with a movement apparatus from the cleaning position; and carrying the object out of the isolated space;

wherein the object is a mould and/or mould part for use in manufacturing glass containers;

wherein the detection system is configured to analyse image data associated with the mould and/or mould part to identify contaminants based on colour and/or shapes within the mould and/or mould part; and wherein the detection system includes an optical sensor to monitor a focal distance of the laser from the surface of the object and continually adjust the focal distance during cleaning and wherein the control apparatus includes a processor in communication with the detection apparatus, the processor being configured to move the laser in a cleaning pattern over the object, in response to observations made by the detection apparatus.

13. A method of claim 12, wherein the object is carried into and out of the isolated space using a tray on the carriage apparatus.

14. The method of claim 12, wherein the detection system comprises a laser scanner or RFID (Radio Frequency Identification) system for reading an individual mark tagged on the mould and/or mould part to track the mould and/or mould part as it moves through the automated cleaning system and/or monitor its cleaning history.

15. The method of claim 12, wherein the detection system further comprises a laser scanning surface system, physical touch system, x-ray inspection and/or ultrasonic inspection device for detecting defects on the surface of the mould and/or mould part.

16. The method of claim 12, wherein the detection system is closed loop feedback system to adjust speed and/or focal distance of the laser during the cleaning process.

17. The method of claim 12, wherein the detection system comprises a marking source to highlight the mould and/or mould part that needs to be repaired, replaced or re-cleaned.

18. The method of claim 12, wherein the detection system comprises an optical sensor to monitor the surface of the mould and/or mould part.

19. A method for automated cleaning of a mould and/or mould part for use in manufacturing glass containers, the method including the steps of:

placing the mould and/or mould part on a carriage apparatus located at a loading station outside a housing;

moving the mould and/or mould part through receiving cells into an isolated space of the housing on the carriage apparatus;

picking up the mould and/or mould part with a handling robot and moving the mould and/or mould part to a scanning area within the isolated space;

scanning the mould and/or mould part using a detection system;

moving the mould and/or mould part with the handling robot from the scanning area and placing the mould and/or mould part in a cleaning position on a rotation apparatus;

cleaning a surface of the mould and/or mould part using a laser mounted on a cleaning robot to remove contaminants from a surface of the mould and/or mould part and wherein the mould and/or mould part is rotated during cleaning;

picking up the mould and/or mould part with the handling robot from the cleaning position and moving the mould and/or mould part to the carriage apparatus and placing the mould and/or mould part back on the carriage apparatus;

and carrying the mould and/or mould part out of the isolated space on the carriage apparatus;

wherein the handling robot has a holding arm to hold the mould and/or mould part, move the mould and/or mould part to or from the cleaning position and then release the mould and/or mould part;

wherein the detection system comprises a vision system including one or more 3D scanning cameras, wherein the one or more 3D scanning cameras is configured to obtain a 3D profile of the mould and/or mould part to identify contaminants that are located on the surface of the mould and/or mould part so that the laser can execute a cleaning routine based on the 3D profile;

wherein the detection system is configured to analyse image data associated with the mould and/or mould part to identify contaminants based on colour and/or shapes within the mould and/or mould part;

wherein the detection system includes an optical sensor to monitor a focal distance of the laser from the surface of the object and continually adjust the focal distance during cleaning; and wherein the cleaning robot comprises a control apparatus to direct the laser at the object in the cleaning position and operate the laser to clean the surface of the object.

\* \* \* \* \*